United States Patent
Westhues et al.

(10) Patent No.: US 10,444,927 B2
(45) Date of Patent: Oct. 15, 2019

(54) STYLUS HOVER AND POSITION COMMUNICATION PROTOCOL

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 72 days.

(21) Appl. No.: 15/594,064

(22) Filed: May 12, 2017

(65) Prior Publication Data
US 2018/0129311 A1    May 10, 2018

Related U.S. Application Data

(60) Provisional application No. 62/418,014, filed on Nov. 4, 2016.

(51) Int. Cl.
*G06F 3/044*      (2006.01)
*G06F 3/0354*    (2013.01)
(Continued)

(52) U.S. Cl.
CPC ........ *G06F 3/0442* (2019.05); *G06F 3/03545* (2013.01); *G06F 3/044* (2013.01);
(Continued)

(58) Field of Classification Search
CPC ..... G06F 3/03545; G06F 3/0412–0416; G06F 3/044; G06F 3/04883–04886;
(Continued)

(56) References Cited

U.S. PATENT DOCUMENTS

| 8,629,358 B2 | 1/2014 | Rimon et al. |
| 9,280,220 B2 | 3/2016 | Shahparnia et al. |

(Continued)

FOREIGN PATENT DOCUMENTS

| WO | 96042068 A1 | 12/1996 |
| WO | 2013153551 A1 | 10/2013 |
| WO | 2015200396 A1 | 12/2015 |

OTHER PUBLICATIONS

Annett, et al., "Hands, Hover, and Nibs: Understanding Stylus Accuracy on Tablets", In Proceedings of the 41st Graphics Interface Conference, Jun. 3, 2015, pp. 203-210.
(Continued)

*Primary Examiner* — David Tung
(74) *Attorney, Agent, or Firm* — Alleman Hall Creasman & Tuttle LLP

(57) ABSTRACT

A touch-sensitive device includes a capacitance-based touch sensor, drive circuitry configured to drive touch sensor electrodes with a synchronization waveform to enable an active stylus to become time synchronized with the touch-sensitive device, and receive circuitry configured to determine a position of the active stylus based on electrostatically receiving a first waveform from the active stylus. Depending on when the touch-sensitive device receives the first waveform from the active stylus, the touch-sensitive device interprets the first waveform differently to determine a position of the active stylus or determine that the active stylus is hovering. In either case, the same waveform is used to communicate different information about the active stylus to the touch-sensitive device.

17 Claims, 7 Drawing Sheets

(51) Int. Cl.
*G06F 3/041* (2006.01)
*G06F 3/0488* (2013.01)

(52) U.S. Cl.
CPC ........ *G06F 3/0416* (2013.01); *G06F 3/04883* (2013.01); *G06F 2203/04101* (2013.01); *G06F 2203/04105* (2013.01); *G06F 2203/04106* (2013.01)

(58) Field of Classification Search
CPC . G06F 2203/04101; G06F 2203/04105; G06F 2203/04106
See application file for complete search history.

(56) References Cited

U.S. PATENT DOCUMENTS

| | | |
|---|---|---|
| 2006/0279548 A1 | 12/2006 | Geaghan |
| 2008/0012835 A1 | 1/2008 | Rimon et al. |
| 2009/0283342 A1 | 11/2009 | Schediwy et al. |
| 2010/0155153 A1* | 6/2010 | Zachut ................ G06F 3/03545 178/18.03 |
| 2011/0115742 A1 | 5/2011 | Sobel et al. |
| 2012/0105362 A1* | 5/2012 | Kremin ............... G06F 3/03545 345/174 |
| 2013/0207925 A1 | 8/2013 | Ryshtun et al. |
| 2015/0002415 A1* | 1/2015 | Lee ..................... G06F 3/03545 345/173 |
| 2016/0048234 A1* | 2/2016 | Chandran ............... G06F 3/044 345/174 |
| 2016/0162051 A1 | 6/2016 | Peretz et al. |
| 2016/0170504 A1 | 6/2016 | Varlamov et al. |
| 2016/0170506 A1 | 6/2016 | Westhues et al. |
| 2016/0195944 A1* | 7/2016 | Gur ..................... G06F 3/03545 345/174 |
| 2016/0202783 A1 | 7/2016 | Bell |
| 2016/0209940 A1 | 7/2016 | Geller et al. |
| 2016/0299583 A1* | 10/2016 | Watanabe ........... G06F 3/03545 |

OTHER PUBLICATIONS

"International Search Report and Written Opinion Issued in PCT Application No. PCT/US2017/058918", dated Feb. 19, 2018, 14 Pages.

* cited by examiner

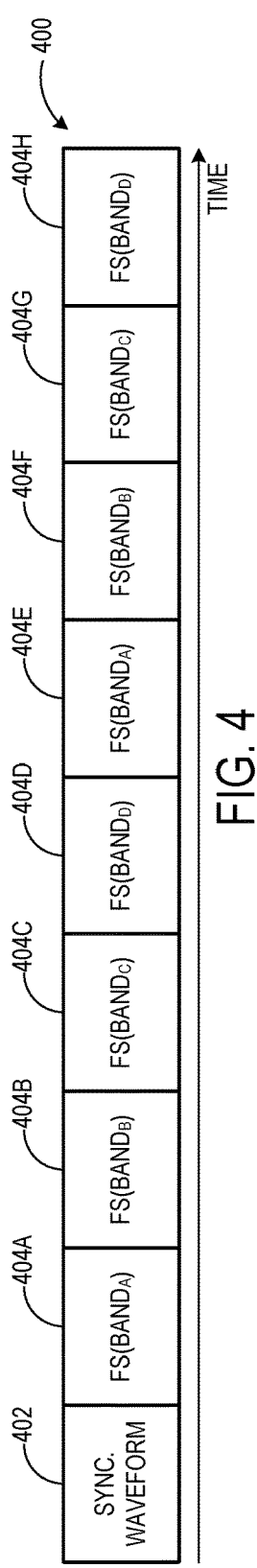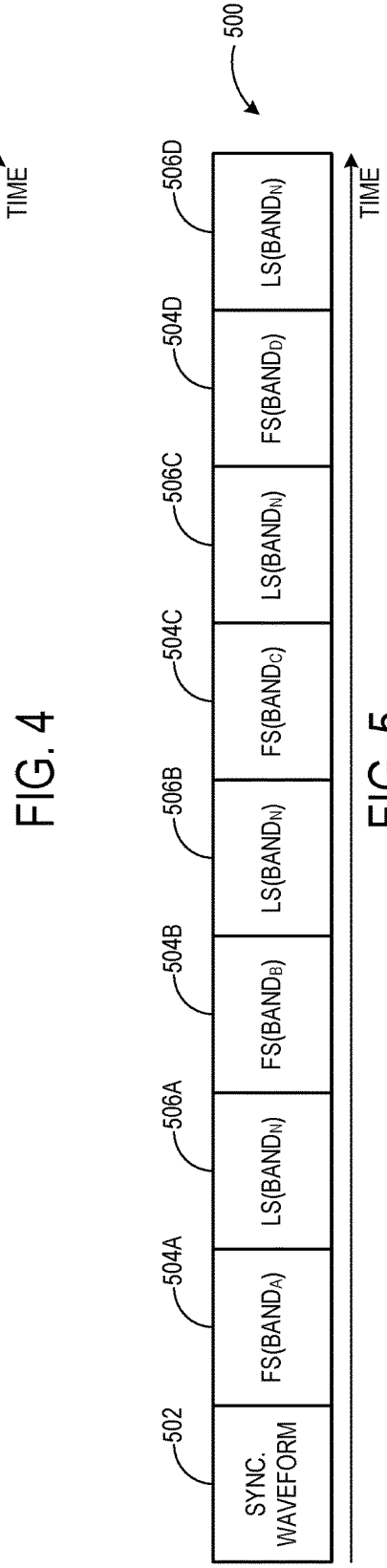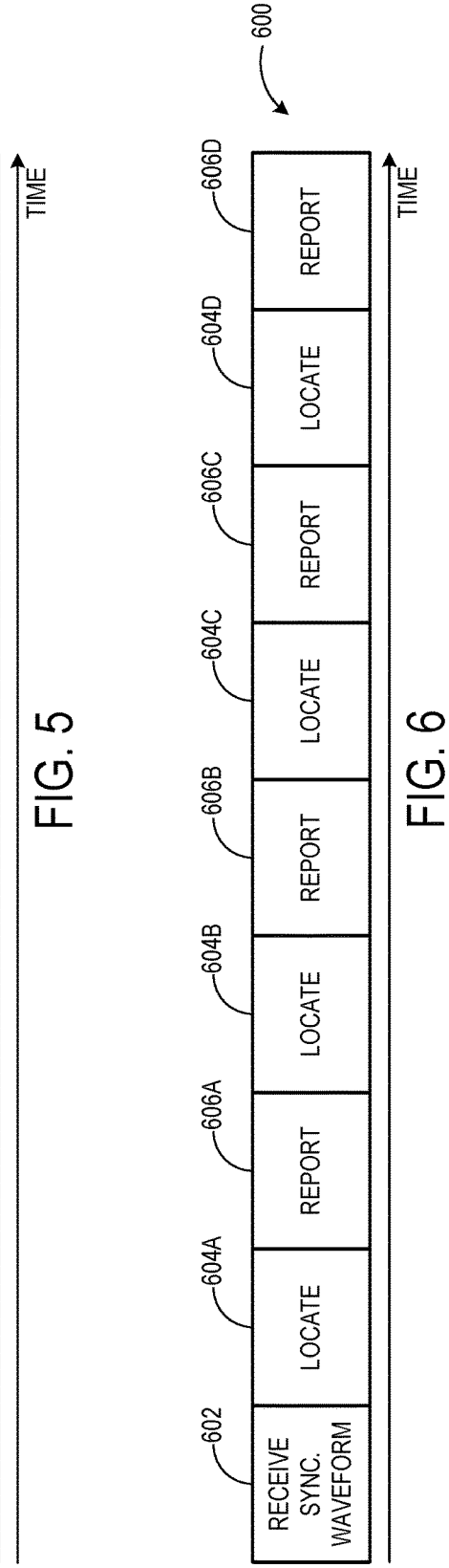

under which stylus should be decoded.

STYLUS HOVER AND POSITION COMMUNICATION PROTOCOL

CROSS REFERENCE TO RELATED APPLICATIONS

This application claims priority to U.S. Provisional Patent Application No. 62/418,014, filed Nov. 4, 2016, the entirety of which is hereby incorporated herein by reference.

BACKGROUND

Many touch-sensitive computing devices employ an active stylus to enhance touch interaction. Determining the position of the stylus and enabling other functionality in such systems may be provided via electrostatic communication, i.e., between the stylus and the touch sensor of the host computing device. The host computing device and its various components (display, capacitive touch sensor, etc.) will at times be collectively referred to herein as a "digitizer."

BRIEF DESCRIPTION OF THE DRAWINGS

FIG. 4 shows an example touch-sensing frame including a plurality of full-search sub-frames.

FIG. 5 shows another example touch-sensing frame including a plurality of full-search sub-frames and a plurality of local-search sub-frames.

FIG. 6 shows an example stylus communication frame.

DETAILED DESCRIPTION

Figure 1:
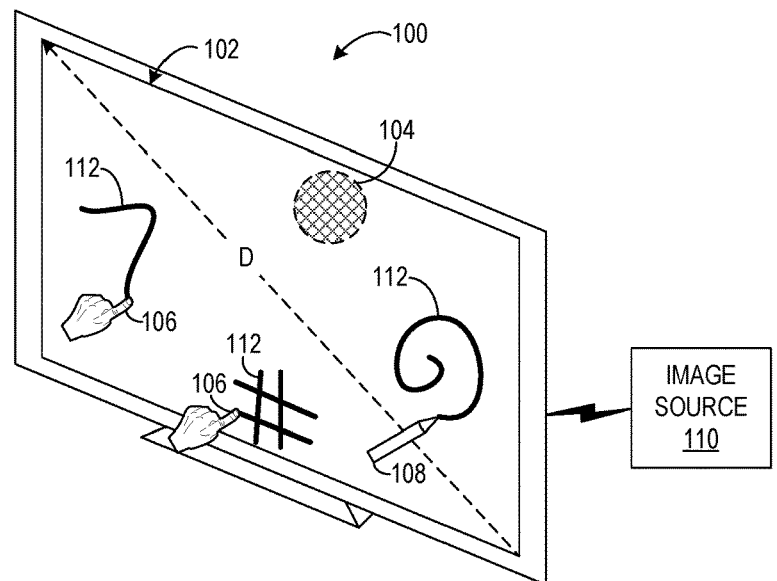
FIG. 1 shows an example display device including a touch sensor receiving touch inputs from a user's body and an active stylus.

As indicated above, many touch interactive computing devices employ an active stylus to enhance functionality. Position sensing and other operations in these devices often is enabled via electrostatic communication between the stylus and digitizer. For example, the stylus may include one or more tip electrode(s) that interacts with electrodes (e.g., rows/columns or independent self-capacitance sensels) of a touch sensor incorporated within the digitizer. Applying an excitation waveform on the stylus electrode influences, when the stylus and digitizer are sufficiently close, electrical behavior at the digitizer (e.g., charge accumulation, capacitance, voltage/current on one or more of the touch sensor electrodes). Similarly, excitation of digitizer electrodes influences conditions on the stylus electrodes.

Electrostatic interaction (e.g., electrode-to-electrode capacitive coupling) between devices can be used for a variety of purposes. For example, capacitive coupling can be used to: (1) send/receive synchronization signals to establish/maintain a shared sense of time between the stylus and the digitizer; (2) determine the location of the stylus relative to the digitizer, which may include use of multiple electrodes to finely interpolate position; (3) communicate state/status between the stylus and digitizer such as identifiers, stylus button state, battery level and the like; and (4) transmit various other data, such as force determined in the stylus tip, firmware updates, encryption keys/information, time at which various events occur, etc. These are but a few non-limiting examples. Ultimately, the digitizer interacting with the touch implements (finger and stylus) is used to control display output and otherwise selectively control the digitizer.

In some cases, waveforms transmitted by the stylus can interfere with touch sensing operations of the digitizer. For example, the stylus may electrostatically transmit a "report" waveform (e.g., indicating position, status, or other data) to the digitizer, and if the digitizer is not operating in the appropriate mode when the digitizer receives the report waveform, then the digitizer may falsely interpret the waveform as a passive (e.g., finger) touch. Moreover, if an actual finger touch is correctly detected by the digitizer at the same time but in a different region of the digitizer, then the digitizer may operate in a conflicting manner due to the two finger touches—i.e., the actual finger touch and false finger touch, occurring far apart from each other.

In one example, the digitizer includes receive circuitry configured to selectively multiplex to different portions of the touch sensor at different times to detect touch. The digitizer is configured to switch between two states of operation: 1) detecting a coarse position of the stylus and finger touch and 2) detecting a precise position of the stylus and receiving other data from the stylus, such as touch force. The stylus may not know when the digitizer switches between the two states of operation. As such, if the stylus transmits a report waveform to indicate touch force at a time when the digitizer is detecting finger touch, then the digitizer falsely interprets the received waveform as a finger touch, and the digitizer does not receive the touch force information. Such interference reduces touch sensing accuracy of the digitizer. Moreover, such interference reduces the robustness of communication between the stylus and the digitizer.

In one example, the stylus may be made aware of the operating state of the digitizer in order to better time synchronize with the digitizer by using a communication protocol that includes a bit to indicate the operating state of the digitizer. In particular, the bit is transmitted by the digitizer during each touch-sensing frame. However, due to the limited bandwidth of electrostatic communication between the stylus and the digitizer, the use of the bit would occupy limited communication resources that could be used elsewhere.

Accordingly, the present disclosure is directed to an approach in which the same waveform is used to communicate either a position of a stylus or a hovering state of the stylus to a touch-sensitive device depending on when the touch-sensitive device receives the waveform. In particular, the touch-sensitive device determines a position of the stylus based on the waveform, when the waveform is received at a first time based on time synchronization between the stylus and the touch-sensitive device. Further, the touch-sensitive device determines that the stylus is hovering when the waveform is received at a second time based on the time synchronization between the stylus and the touch-sensitive device. By using the same "locate" and "hover" waveform to communicate different types of information at different times, the stylus can communicate information in a manner that does not interfere with touch sensing operations of the touch-sensitive device.

Furthermore, in implementations where the touch-sensitive device switches between two states of operation, by using the same waveform to communicate information in both operating states, the stylus does not need to know the operating state of the touch-sensitive device in order to successfully transmit the appropriate information. In this way, the bit that indicates the operating state of the touch-sensitive device may be omitted from the touch-sensing frame that is used by the touch-sensitive device.

FIG. 1 shows a touch interactive display system 100 including a display device 102 that has a touch sensor 104. In some examples, display device 102 may be a large format display with a diagonal dimension D greater than 1 meter, though the display may assume any suitable size. Display device 102 may be configured to sense one or more sources of input, such as touch input imparted via fingers 106 and/or input supplied by an input device 108, shown in FIG. 1 as a stylus. The stylus 108 may be passive or active. An active stylus may include an electrode configured to transmit a waveform that is received by the touch sensor 104 to determine a position of the active stylus. The fingers 106 and input device 108 are provided as non-limiting examples, and any other suitable source of input may be used in connection with display device 102. Display device 102 may be configured to receive input from styluses and fingers in contact with the display 102 and/or "hovering" over the display surface. "Touch input" as used herein refers to both finger and non-finger (e.g., stylus) input, and to input supplied by input devices both in contact with, and spaced away from but proximate to, display device 102. In some examples, display device 102 may be configured to receive input from two or more sources simultaneously, in which case the display may be referred to as a multi-touch display.

Display device 102 may be operatively coupled to an image source 110, which may be, for example, a computing device external to, or housed within, the display. Image source 110 may receive input from display device 102, process the input, and in response generate appropriate graphical output 112 for the display. In this way, display device 102 may provide a natural paradigm for interacting with a computing device that can respond appropriately to touch input. Details regarding an example computing device are described below with reference to FIG. 10.

Figure 2:
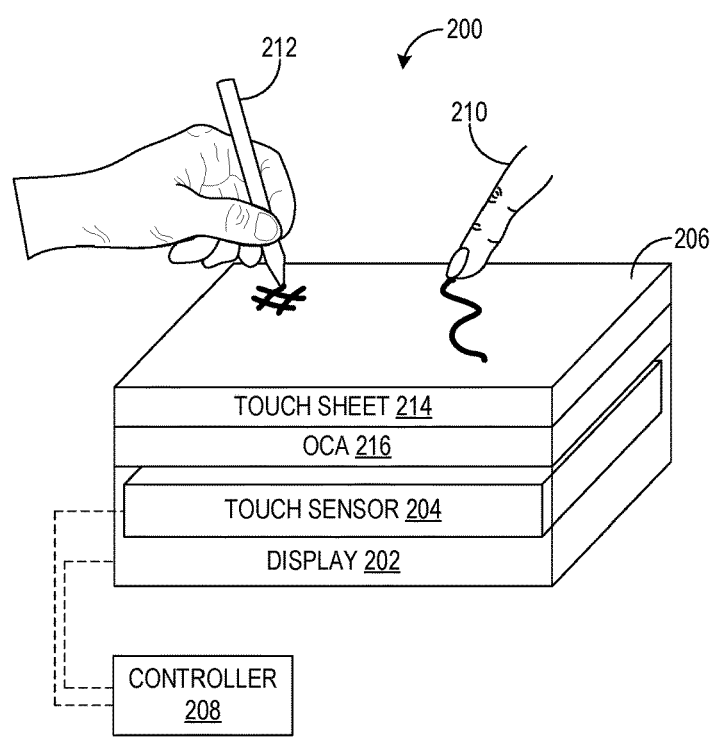
FIG. 2 shows an example touch-sensitive display device.

FIG. 2 shows an example touch-sensitive display device 200, which includes a display 202 and a touch sensor 204 to respectively enable the output of graphical content and reception of input. Display 202 is operable to emit light in an upward direction through display device 200, such that perceptible images can be formed at a top surface 206 of the display device or at other apparent location(s). For example, display 202 may assume the form of a liquid crystal display (LCD), organic light-emitting diode display (OLED), or any other suitable display. To effect display operation, FIG. 2 shows display 202 operatively coupled to a controller 208, which may control pixel operation, refresh rate, drive electronics, operation of a backlight if included, and/or other aspects of the display. A suitable image source, which may be integrated with, or provided separately from, controller 208, may provide graphical content for output by display 202. The image source may be a computing device external to, or integrated within, display device 200, for example.

Touch sensor 204 is operable to receive input, which may assume various suitable form(s). As examples, touch sensor 204 may detect (1) touch input applied by a human finger 210 in contact with top surface 206 of display device 200; (2) a force and/or pressure applied by the finger 210 to the top surface 206; (3) hover input applied by the finger 210 proximate to but not in contact with top surface 206; (4) a height of the hovering finger 210 from the top surface 206, such that a substantially continuous range of heights from the top surface 206 can be determined; and/or (5) input from a non-finger touch source, such as an active stylus 212. As described in further detail below, touch sensor 204 may receive position, tip force, button state, and/or other information from stylus 212, and in some examples, may transmit information to the stylus. Touch sensor 204 may be operable to receive input from multiple input sources (e.g., digits, styluses, other input devices) simultaneously, in which case display device may be referred to as a "multi-touch" display device. To enable input reception, touch sensor 204 may be configured to detect changes associated with the capacitance of a plurality of electrodes of the touch sensor 204, as described in further detail below.

Touch inputs (and/or other information) received by touch sensor 204 are operable to affect any suitable aspect of display 202 and/or a computing device operatively coupled to display device 200, and may include two or three-dimensional finger inputs and/or gestures. As an example, FIG. 2 depicts the output of graphical content by display 202 in spatial correspondence with paths traced out by digit 210 and stylus 212 proximate to top surface 206. While FIG. 2 shows controller 208 as effecting operation of both display 202 and touch sensor 204 (e.g., electrode drive/receive operation), separate display and touch sensor controllers may be provided.

Display device 200 may be implemented in a variety of forms. For example, display device 200 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, laptop computers, etc.

Display device 200 may include other components in addition to display 202 and touch sensor 204. As an example, FIG. 2 shows the inclusion of an optically clear touch sheet 214 providing top surface 206 for receiving touch input as described above. Touch sheet 214 may be comprised of any suitable materials, such as glass or plastic. Further, an optically clear adhesive (OCA) 216 bonds a bottom surface of touch sheet 214 to a top surface of display 202. As used herein, "optically clear adhesive" refers to a class of adhesives that transmit substantially all (e.g., about 99%) of incident visible light. Alternatively or additionally, display device 200 may include any suitable components not shown in FIG. 2, including but not limited to various optical elements (e.g., lens, diffuser, diffractive optical element, waveguide, filter, polarizer).

FIG. 2 depicts the integration of touch sensor 204 within display 202 in a so-called "in-cell" touch sensor implementation. In this example, one or more components of display device 200 may be operated to perform both display output and input sensing functions. As a particular example, the same physical electrical structure may be used both for capacitive sensing and for determining the field in the liquid crystal material that rotates polarization to form a displayed image. Alternative or additional components of display device 200 may be employed for display and input sensing functions, however.

Other touch sensor configurations are possible. For example, touch sensor 204 may alternatively be implemented in a so-called "on-cell" configuration, in which the touch sensor is disposed directly on display 202. In an example on-cell configuration, touch sensing electrodes may be arranged on a color filter substrate of display 202. Implementations in which touch sensor 204 is configured neither as an in-cell nor on-cell sensor are possible, however. In such implementations, an optically clear adhesive (OCA) may be interposed between display 202 and touch sensor 204, for example.

Touch sensor 204 may be configured in various structural forms and for different modes of capacitive sensing. In a self-capacitance mode, the capacitance and/or other electrical properties (e.g., voltage, charge) between touch sensing electrodes and ground may be measured to detect inputs. In other words, properties of the electrode itself are measured, rather than in relation to another electrode in the capacitance measuring system. Additional detail regarding self-capacitance touch sensing is described below with reference to FIG. 3, which shows an example self-capacitance touch sensor that can be implemented in an in-cell or on-cell fashion.

In a mutual capacitance mode, the capacitance and/or other electrical properties between electrodes of differing electrical state may be measured to detect inputs. When configured for mutual capacitance sensing, and similar to the above examples, touch sensor 204 may include a plurality of vertically separated row and column electrodes that form capacitive, plate-like nodes at row/column intersections when the touch sensor is driven. The capacitance and/or other electrical properties of the nodes can be measured to detect inputs.

When configured as a capacitive sensor, touch sensor 204 may include a plurality of electrodes that are selectively driven to receive input. The plurality of electrodes may assume a variety of suitable forms, including but not limited to (1) elongate traces, as in row/column electrode configurations, where the rows and columns are arranged at substantially perpendicular or oblique angles to one another; (2) substantially contiguous pads, as in mutual capacitance configurations in which the pads are arranged in a substantially common plane and partitioned into drive and receive electrode subsets, or as in in-cell or on-cell configurations; (3) meshes; and (4) an array of isolated (e.g., planar and/or rectangular) electrodes each arranged at respective x/y locations, as in in-cell or on-cell configurations.

In some scenarios, touch sensor 204 may identify the presence of an input source by driving at least a subset of electrodes, and analyzing output resulting from such driving at the same or different subset of electrodes. For mutual capacitance implementations, a drive signal (also referred to herein as an "excitation waveform") such as a time-varying voltage may be applied to a first subset of electrodes (e.g., "drive" electrodes), thus influencing an output signal at a second subset of electrodes (e.g., "receive" electrodes). The presence of an input source may then be ascertained by analyzing the output signal as described below.

For self-capacitance implementations, one or more electrode characteristics may be analyzed to identify the presence of an input source. Typically, this is implemented via driving an electrode with a drive signal, and observing the electrical behavior with receive circuitry attached to the electrode. For example, charge accumulation at the electrodes resulting from drive signal application can be analyzed to ascertain the presence of the input source. In these example methods, input sources of the types that influence measurable properties of electrodes can be identified, such as human digits, which may affect electrode conditions by providing a capacitive path to ground for electromagnetic fields. Other methods may be used to identify different input source types, such as those with active electronics.

In both mutual and self-capacitance implementations, touch sensor 204 may employ a correlation-based approach in analyzing output signals to perform input source detection, among other potential tasks. In this approach, a given output signal may be correlated with one or more reference sequences using a suitable correlation operation (e.g., cross-correlation) to obtain correlated output with a sufficient signal-to-noise ratio. The correlation operation may yield a number that can be compared to a threshold such that, if the number meets or exceeds the threshold, touch sensor 204 determines that an input source is present, and if the number falls below the threshold, the touch sensor determines that an input source is not present. In some examples, a drive signal used to drive electrodes may be used as a reference sequence. Further, one or more reference sequences may be designed to mitigate noise for certain operating conditions, noise sources, and/or wavelength bands.

Figure 3:
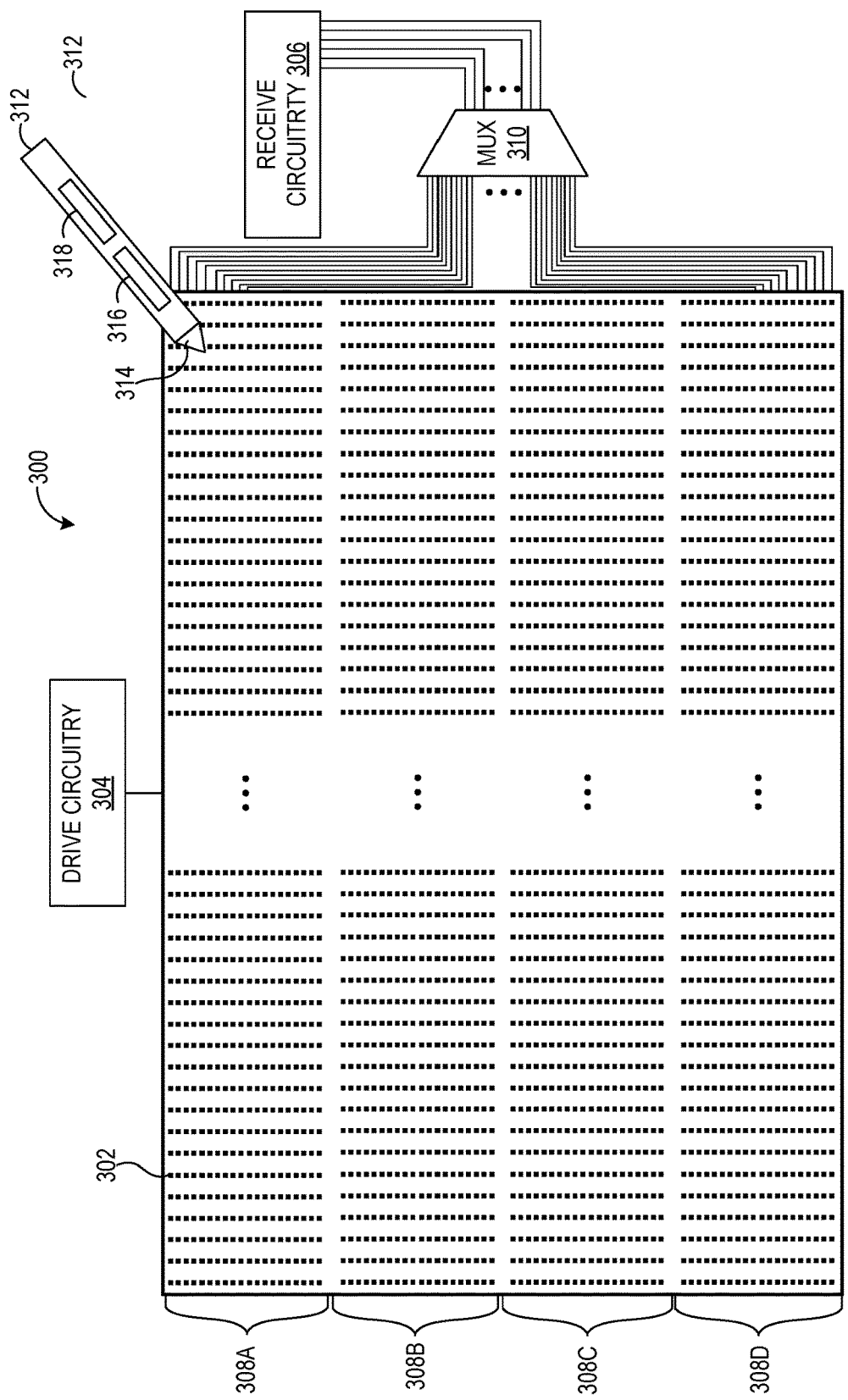
FIG. 3 shows an example in-cell touch sensor matrix.

FIG. 3 shows an example touch sensor 300. Touch sensor 300 includes a plurality of electrodes, such as electrode 302, one or more of which are selectively driven to receive input in one or more of the forms described above—e.g., touch, hover, force/pressure, stylus/active input device. FIG. 3 is described in the context of an in-cell implementation, in which touch sensor 300 is configured as an in-cell sensor in combination with a display as described above. As such, touch sensor 300 may be touch sensor 204 of touch-sensitive display device 200, both of FIG. 2. However, touch sensor 300 may be implemented as an on-cell touch sensor, or as neither an in-cell nor on-cell sensor that is discrete and separate from a display. For in-cell and on-cell implementations, the plurality of electrodes is referred to herein as a plurality of "sensels."

To enable sensel charging, the sensels are operatively coupled to drive circuitry 304. Via drive circuitry 304, each sensel is selectively driven with one or more drive signals. To enable sensing of touch input, the sensels are operatively coupled to receive circuitry 306. In particular, one or more electrical characteristics (e.g., capacitance, voltage, charge) of the sensels influenced by such driving via drive circuitry 304 are monitored via receive circuitry 306 to perform input sensing. Receive circuitry 306 may perform correlation operations on output received from the sensels as described above with reference to FIG. 2. In one example, output from a given sensel may be used in a correlation operation after charging of the sensel for an integer number of iterations in an integration period. Alternatively or additionally, the sensel may be continuously monitored during charging. In either case, self-capacitance of the plurality of sensels is measured for input sensing.

Due to the relatively large number of sensels included in a typical implementation of touch sensor 300, a limited number of sensels are shown in FIG. 3 for simplicity/clarity. Examples described below contemplate a particular configuration in which touch sensor 300 includes 20,000 sensels—e.g., when implemented in a large-format display device. Touch sensor 300 may include any suitable number of sensels, however.

In one example, touch sensor 300 includes 20,000 sensels arranged in 100 rows and 200 columns. While it may be desirable to maximize sensing frequency by simultaneously measuring capacitance at each sensel, this would entail provision of significant processing and hardware resources. In particular, 20,000 receivers (e.g., analog-to-digital converters) in receive circuitry 306 would be needed to perform full-granularity, simultaneous self-capacitance measurements at each sensel. As such, partial-granularity, multiplexed approaches to self-capacitance measurement may be desired to reduce the volume of receive circuitry 306.

FIG. 3 illustrates one example approach to partial-granularity self-capacitance measurement in touch sensor 300, in which the sensels are grouped into horizontal bands 308A-308D, each having twenty-five rows of sensels. In this approach, self-capacitance measurements are temporally multiplexed via a multiplexer 310 such that a respective measurement time slot is provided for each band 308 in a touch sensing frame. Accordingly, receive circuitry 306 may include a number of receivers equal to the number of sensels in a given band 308—e.g., 5,000 receivers. However, any suitable number and geometric grouping of sensels may be used in a multiplexing scheme to reduce the volume of receive circuitry. Further, similar grouping may be performed to reduce the volume of drive circuitry 306, alternatively or in addition to the use of partial-granularity receive circuitry.

Touch sensor 300 may employ a variety of modes to effect sensel operation to perform input sensing. These modes may be referred to sometimes as "search modes." In one example search mode, all sensels are driven to produce a waveform that may be influenced by touch input and/or received by a stylus that is within range of the touch sensor 300. By driving all sensels at the same time, drive circuitry 304 may be simplified. When combined with partial-granularity measurement described above, all sensels may be driven even though only a single band 308 is being read at any given time. Drive circuitry 304 may apply a single drive signal during a mode, differing drive signals during the mode, or may employ multiple modes with differing drive signals. Further, drive circuitry 304 may switch among two or more modes to alter input source detection and/or to facilitate communication with an active input device such as an active stylus.

In some implementations, drive circuitry 304 may employ a "full search" mode and a "local search" mode. In a full search, and in combination with partial-granularity measurement, bands 308 are successively searched to detect finger touches and other input sources such as an active or passive stylus. Beyond presence, the full search may also indicate the specific location (e.g., in the form of x/y coordinates relative to touch sensor 300) of some types of detected input sources (e.g., passive sources such as fingers). However, the location indicated by the full search for an active input device, such as an active stylus, may carry a degree of uncertainty—for example, the full search may be configured to determine only an approximate or coarse location of the input device such as a band 308, and not a specific x/y location within the identified band. For example, speed/timing constraints and/or signal-to-noise ratio may limit the resolution of position determination. As such, local search operations may follow full search to determine a specific x/y input device location. In the local search, the particular band 308 in which the presence of an input device was (coarsely) identified by the full search is more thoroughly examined to determine the specific x/y input device location.

Referring to active stylus 312, the stylus includes electrode tip 314 (and potentially additional electrodes) configured to capacitively couple with one or more electrodes 302 of touch sensor 300. The stylus 312 is configured to electrostatically transmit and/or receive signals to/from touch sensor 300 via electrode tip 314. Stylus 312 further includes receive circuitry 316 and transmit circuitry 318. Receive circuitry 316 is configured to interpret a response on electrode tip 314 when a waveform is driven on one or more electrodes 302 of the touch sensor 300. Touch sensor 300 may transmit any suitable waveforms to communicate different types of information to stylus 312. For example, touch sensor 300 may transmit a synchronization waveform to enable stylus 312 to become synchronized with touch sensor 300 when stylus 312 is proximate to touch sensor 300. Transmit circuitry 318 is configured to drive electrode tip 314 to transmit one or more waveforms to touch sensor 300. Stylus 312 may transmit any suitable wave forms to communicate different types of information to touch sensor 300. In some examples, stylus 312 may transmit a waveform to touch sensor 300 to enable location determination of the stylus during full and local searches. In one example, the waveform is based on the drive signal applied to the sensels by drive circuitry 304, which, in the presence of a finger proximate to touch sensor 300, induces sensel output that is similar to output induced by the finger but opposite in polarity. In another example, the waveform transmitted by the stylus electrode to the sensels is orthogonal to the waveform produced by finger touch. These examples may enable simultaneous detection of stylus 312 and the finger by the touch sensor 300.

Generally, communication between stylus 312 and touch sensor 300 can be used to (1) determine the location of the stylus relative to the touch sensor; (2) send/receive synchronization signals to establish/maintain a shared sense of time between the stylus and the touch sensor; (3) communicate state/status between the stylus and digitizer such as identifiers, stylus button state, battery level and the like; and/or (4) transmit various other data, such as force determined in the stylus tip, firmware updates, encryption keys/information, time at which various events occur, etc. While not shown in FIG. 3, touch sensor 300 and stylus 312 may include components configured to enable radio communication therebetween, which may perform one or more of the functions described above and/or other functions.

Some instances of a full and/or local search may be accompanied by a synchronization period to enable temporal synchronization between touch sensor 300 and stylus 312. The synchronization period may enable stylus 312 to ascertain when signal transmission to touch sensor 300 is allowed (e.g., during full and/or local searches), and when to listen for signals from the touch sensor (e.g., signals that enable the synchronization to occur). As such, in some examples a full touch sensing frame may include a synchronization period followed by full and local searches. As examples, touch sensor 300 may employ a framerate of 40-50 Hz to 120 Hz and beyond. The synchronization period is also referred to herein as a "stylus sync sub-frame," and sensels driven as a part of the sync-frame are referred to herein as "sync-driven" sensels or electrodes.

As used herein, "full search" mode is a mode in which all electrodes of the touch sensor are "searched." This full search process may happen all at the same time by listening at each sensel or may happen over time by multiplexing receive circuitry to different regions or bands of sensels over time. In the full search mode, all of the electrodes of the touch sensor 300 may be searched in a designated period—e.g., a touch-sensing frame. As used herein, "local search" mode is a mode in which a particular region or band of sensels is serviced during a designated duration—e.g., a touch-sensing frame while other sensels outside of the particular region or band are not serviced. The sensels within the designated band may be serviced as part of any suitable operation. For example, the sensels within the designated region or band may be multiplexed to receive circuitry to determine a precise position of an active stylus.

In some implementations, the touch sensor 300 may be configured to operate in a full-search-only mode where the touch sensor 300 only performs full searches without local searches. The touch sensor 300 may operate in this mode when the receive circuitry 306 has not received the waveform from the stylus 312 for greater than a threshold duration. In other words, the touch sensor 300 may operate in this mode when the stylus 312 (and any other active stylus) is not within a detectable range of the touch sensor 300. The threshold duration may be set to any suitable duration. In one example, the threshold duration is three seconds.

While operating in the full-search-only mode, the touch sensor may use a first touch-sensing frame 400 shown in FIG. 4. The first touch-sensing frame 400 is initiated by a stylus-sync sub-frame 402 in which touch sensor 300 transmits a synchronization waveform to stylus 312. If stylus 312 is within range of touch sensor 300, the stylus 312 receives the synchronization waveform at a sufficient above-threshold strength. The stylus 312 uses the sync waveform to achieve a shared sense of time between the stylus 312 and touch sensor 300. In other words, time synchronization between the stylus 312 and the touch sensor 300 is triggered by the stylus receiving the synchronization waveform. This enables the stylus 312 to gain knowledge of the appropriate time to transmit selected waveforms and information to the touch sensor 300. Sync sub-frame 402 is followed by a plurality of full-search sub-frames 404 (e.g., 404A-404H). Each full-search sub-frame 404 is denoted in FIG. 4 with the band or subset of sensels being searched. For example, sub-frame 404A is depicted as FS(BAND$_A$), indicating that, while all sensels of touch sensor 300 may be driven during the full-search sub-frame, output reception and input sensing is limited to band 308A due to the multiplexing of the sensels in that band to receive circuitry 306.

In the full-search-only mode, because no waveform has been received from the stylus 312, there is no precise stylus position to determine. As such, local-search sub-frames may be omitted from the first touch-sensing frame 400. By omitting the local-search sub-frames from the first touch-sensing frame 400, the number of full-search sub-frames that may be included in the first touch-sensing frame 400 may be increased. In the illustrated example, each local-search sub-frame is replaced by a full-search sub-frame in the first touch-sensing frame 400. In particular, bands 308A-308D are scanned twice during the first touch-sensing frame 400. This effectively doubles the frame rate of the touch sensor 300 to detect finger touch and the coarse position of the stylus 312 when the stylus is detected by the touch sensor 300. As such, when the touch sensor 300 operates in the full-search-only mode and uses the first touch-sensing frame 400, the touch sensing performance of the touch sensor 300 may be increased.

In some implementations, when the stylus 312 is out of range to receive the synchronization waveform from the touch sensor 300, the stylus may operate in a sleep mode where the stylus does not transmit waveforms via the electrode tip 314. However, the stylus 312 may still receive waveforms via the electrode tip 314 in the sleep mode. For example, the sleep mode may be employed to conserve the stylus's battery power. When the stylus 312 does receive the synchronization waveform from the touch sensor 300, the stylus may "wake up" and begin transmitting a "locate" waveform that may be received by the touch sensor 300.

Once the touch sensor 300 detects the locate waveform from the stylus 312, the touch sensor 300 switches to operation in a full-and-local search mode. The touch sensor 300 may operate in the full-and-local search mode if the touch sensor has received the locate waveform from the stylus 312 within a threshold duration. In this mode, the touch sensor 300 performs full and local searching using a second touch-sensing frame 500 shown in FIG. 5. The second touch-sensing frame 500 is initiated by a stylus synchronization sub-frame 502 in which touch sensor 300 transmits the synchronization waveform to stylus 312. The stylus synchronization sub-frame 502 is followed by a full-search sub-frame 504A. In some examples, full-search sub-frame 504A may yield an adequately accurate location of touch input (e.g., as applied by a human digit or other passive input source), but an inadequately accurate location of stylus 312. As such, local-search sub-frame 506A may follow full-search sub-frame 504A to refine the initial estimated location of stylus 312 as described above. Specifically, results from the full-search sub-frame 504A indicate the presence/approximate location of stylus 312 in a particular band (e.g., BAND$_N$). As such, full-search sub-frame 504A is followed by a local-search sub-frame 506A, denoted in FIG. 5 as LS(BAND$_N$), indicating local searching in the particular band 308N identified by full-search sub-frame 504A.

FIG. 5 also depicts additional full-search sub-frames each followed by corresponding local-search sub-frames in the band(s) 308: a full-search sub-frame 504B in band 308B, followed by a local-search sub-frame 506B in the band 308N; a full-search sub-frame 504C in band 308C, followed by a local-search sub-frame 506C in the band 308N; and a full-search sub-frame 504D in band 308D, followed by a local-search sub-frame 506D in the band 308N. From the above, it will be understood that the band 308 multiplexed to receive circuitry 306 may vary between full and local-search sub-frames—e.g., the band 308 in which a local-search sub-frame is prompted by a preceding full-search sub-frame may differ from the band 308 that was multiplexed to the receive circuitry during performance of the preceding full-search sub-frame.

In some implementations, the local-search sub-frames may be used to refine an indeterminate location of the active stylus, such as a band 308. Specifically, during a local-search sub-frame, a local search may be performed in an identified band following a rough position determination via a full search, to resolve location to a desired degree of accuracy, such as a particular x/y location of the active stylus. In other implementations, full-search and local-search sub-frames may produce the same level of position accuracy, and the local-search sub-frames may be used to increase the frame rate of detecting the active stylus position. In other words, the local-search sub-frames may be used to update the position of the active stylus with the same level of accuracy from the initial position estimate determined during the full-search sub-frames.

Furthermore, in some implementations, the position of the active stylus may be determined during full-search sub-frames, and local-search sub-frames may be dedicated to receiving stylus state information from an active stylus at touch sensor 300. For example, the stylus state information may include information regarding battery level, firmware version, tip force/pressure values, and/or button state, among other potential data. The full-and-local search touch-sensing frame may include multiple local-search sub-frames to receive stylus state information at multiple times within the touch frame. In this way, an increased frequency of receiving stylus state information may reduce the latency of active stylus operation. Furthermore, other uses for local-search sub-frames are possible.

In the above described example touch-sensing frames, the stylus synchronization sub-frame initiates the touch sensing frame, though implementations are contemplated in which the sync sub-frame occurs at other temporal positions within touch-sensing frames. The inclusion of two or more stylus sync sub-frames within a touch sensing frame is also contemplated.

Touch sensor 300 may vary the inclusion of the synchronization period, full-search, and local search, as well as their durations, on a frame-to-frame basis. For example, the composition of a frame may be adjusted in view of the greater duration of the local search relative to the full-search, which may be a result of more granular or complex measurement and/or processing in the local search.

Touch sensor 300 may be configured to switch back to operation in the full-search-only mode based on not receiving the waveform from the stylus 312 (or any other active stylus) for greater than the threshold duration. In other words, when the stylus 312 has moved out of electrostatic communication range, the touch sensor 300 switches to using the first touch-sensing frame to increase passive touch sensing performance.

As discussed above, the stylus 300 may not know in which mode the touch sensor is operating. In order to send waveforms that are accurately interpreted by the touch sensor 300, the stylus 312 may use a communication frame 600 shown in FIG. 6. The communication frame 600 may be initiated upon receiving the synchronization waveform from the touch sensor 300 during a receive synchronization waveform sub-frame 602. The synchronization sub-frame 602 is followed by a locate sub-frame 604A. During the locate sub-frame 604A, the stylus 312 transmits a first waveform that may be used by the touch sensor 300 to locate the stylus 312 (referred to at times as the "locate waveform"). For example, the locate waveform may be based on a waveform driven on the electrodes 302 of the touch sensor 300 to detect finger touch as well as touch from other passive sources. In some implementations, the locate waveform may be orthogonal to, or have an opposite polarity of, the waveform generated by a finger touch.

Furthermore, a report sub-frame 606A may follow the locate sub-frame 604A to transmit state information about the stylus or other data. During the report sub-frame 606A, for example, the stylus 312 may transmit one or more waveforms that encode data bits. For example, the data bits may include information about the stylus 312 (or other information). For example, such stylus information may include a touch force, such as a pressure measured by a pressure sensor (not shown) of the stylus 312. Other information may include identifiers, stylus button state, battery level, firmware updates, encryption keys/information, time at which various events occur, etc. These are but a few non-limiting examples. During the report sub-frame 606A, if the stylus 312 determines that the touch force is zero—i.e., the stylus is hovering, then the stylus 312 transmits the locate waveform to the touch sensor 300 to indicate that the stylus is hovering. If the stylus 312 determines that the touch force is non-zero, then the stylus 312 transmits one or more additional waveforms that differ from the locate/hover waveform to the touch sensor 300. The one or more additional waveforms encode data bits that represent the stylus information such as the touch force (and/or other data). The stylus information may be encoded in the one or more additional waveforms in any suitable manner. For example, the stylus information may be encoded into the one or more additional waveforms via binary phase-shift keying (BPSK). FIG. 6 also depicts additional locate sub-frames 604B-604D each followed by corresponding report sub-frames 606B-606D during which different waveforms may be transmitted to the touch sensor 300 in the same manner as discussed above.

The communication scheme described herein may, in some examples, reduce the possibility of errors in stylus-display electrostatic communication. One example illustration of this may be seen in the context of the touch-sensing and communication frames shown in FIGS. 4-6. When stylus 312 is out of range, its tip electrode in typical examples is off and not transmitting (e.g., to save power), at which time the touch sensor 300 may be operating to detect finger touch in full-search-only mode (FIG. 4). As the stylus moves toward the touch sensor, at some point it is sufficiently close to receive the sync waveform (sub-frame 402). The stylus then acquires the shared timing with the touch sensor and begins transmitting on its tip electrode 314 per the frame structure shown in FIG. 6, i.e., waveforms in alternating locate and report sub-frames.

At some point after the stylus starts transmitting, the touch sensor 300 first receives the waveform transmitted from the stylus 312, which triggers the touch sensor to switch from the sub-frame structure of FIG. 4 (full search only) to that of FIG. 5 (local search sub-frames as well as full-search sub-frames). Thus, for a period of time, the stylus is active and using the protocol of FIG. 6 while the touch sensor is still operating in a mode that is predicated on the stylus not being present (FIG. 4). One conception of this is that the modes are mismatched—the stylus is present (and potentially transmitting interfering waveforms) while the touch sensor is operating in a mode with all of its relevant slots being allocated to detecting finger touch.

In some examples, as described elsewhere, the stylus may not be aware of which mode the touch sensor is in. This may be desirable and intentional, in order to avoid the increased complexity and resource consumption associated with communicating mode states. Therefore, the mode mismatch referenced above carries the specific risk that the stylus will transmit something during one of the FIG. 4 sub-frames that creates a false touch or other interference. As previously discussed, the locate waveform, by design, does not interfere with touch detection. It in fact may be sent by the stylus during sub-frames employed for finger touch detection, in order to produce a coarse estimate of stylus location.

The mechanism herein thus employs, as the "hover waveform" sent by the stylus during the report sub-frames, the same waveform as the "locate waveform" sent during the locate subframes. Thus, during the period of mismatch (stylus actively transmitting while the touch sensor still using frame structure of FIG. 4), the stylus will not send any interfering waveform until it is "not hovering." Thus, it will not be until the stylus makes contact with the display and experiences non-zero tip pressure that it will switch to the interfering "report waveform" (pressure or other data bits). The delay produced by such waveform selection gives the touch sensor more time to recognize the presence of the stylus and switch over to the mode in which it is prepared to receive the otherwise-interfering waveforms (i.e., the ones that might cause false touch detection).

An extreme timing example illustrating the benefit of this approach is as follows: suppose that a rapidly-approaching stylus first comes within signal range at exactly one time slot after the touch sensor sends its sync waveform (sub-frame 402). Then it will not be until the beginning of the next frame of the touch sensor that it receives the sync beacon—almost an entire frame will have passed and the stylus has moved that much closer to the display until it receives the beacon and turns on its stylus electrode. This, in turn, means the stylus is that much closer to the display before the touch sensor switches into the mode of FIG. 5 in which it can safely receive waveforms such as those encoding force bits. Use of common locate and hover waveforms reduces the risk that, for a FIG. 6 stylus report sub-frame matched with a FIG. 4 full-search sub-frame, the stylus will send a waveform interfering with touch detection.

Figure 7:
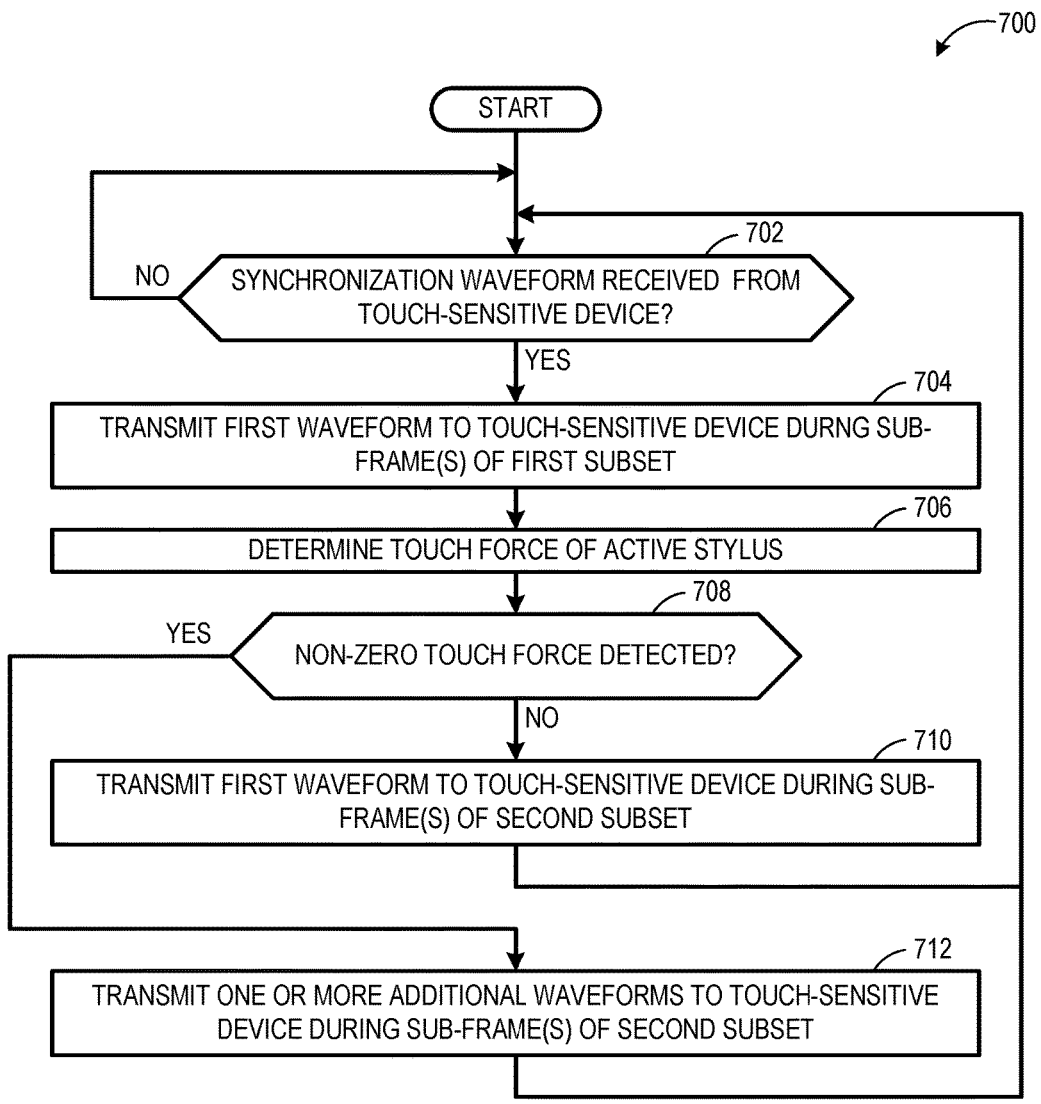
FIG. 7 shows an example method for an active stylus to transmit information to a touch-sensitive device.

FIG. 7 shows an example method 700 for an active stylus to transmit information to a touch-sensitive device. In one example, the method 700 may be performed by the stylus 312 to transmit information to the touch sensor 300 of FIG. 3. Generally, the method 700 may be performed by any suitable active stylus.

At 702, the method 700 includes determining whether a synchronization waveform is electrostatically received from a touch-sensitive device via capacitive coupling between a stylus electrode of the active stylus and one or more electrodes of a touch sensor of the touch-sensitive device. If the synchronization waveform is received, then the method moves to 704. Otherwise, the method 700 returns to 702 and checks for the synchronization waveform. At 704, the method 700 includes electrostatically transmitting the first waveform to the touch-sensitive device during one or more sub-frames of a first subset of sub-frames in a communication frame that is based on time synchronization with the touch-sensitive device. As referenced above, this first waveform may be referred to as a "locate" waveform. In one example, the first subset of sub-frames includes the locate sub-frames 604 of the communication frame 600. The stylus transmits the locate waveform during the first subset of sub-frames to indicate a position of the stylus to the touch-sensitive device.

At 706, the method 700 includes determining a touch force of the active stylus. For example, the touch force may include a pressure measured by a pressure sensor of the active stylus. At 708, the method 700 includes determining whether the touch force is non-zero. If the touch force is not non-zero, then the method 700 moves to 710, and the first waveform is transmitted to the touch-sensitive device during sub-frames of a second subset in the communication frame. In one example, the second subset of sub-frames includes the report sub-frames 606 of the communication frame 600. The stylus transmits the first waveform during the second subset of sub-frames to indicate that the stylus is hovering or has a touch force that is zero to the touch-sensitive device. Thus, as described above, the "locate waveform" may be the same as the "hover waveform."

Otherwise, the method 700 moves to 712, and one or more additional waveforms are transmitted to the touch-sensitive device during the sub-frames of the second subset. The one or more additional waveforms (the "report waveform(s)") encode stylus information to be communicated to the touch sensor. For example, the one or more additional waveforms may encode the non-zero touch force of the active stylus. The active stylus transmits the one or more additional waveforms during the second subset of sub-frames to indicate the stylus information (e.g., non-zero touch force) to the touch-sensitive device. Upon sending the locate/hover waveform or the one or more additional waveforms during the second subset of sub-frames, the method 700 returns to 702 to repeat the method 700.

Figure 8:
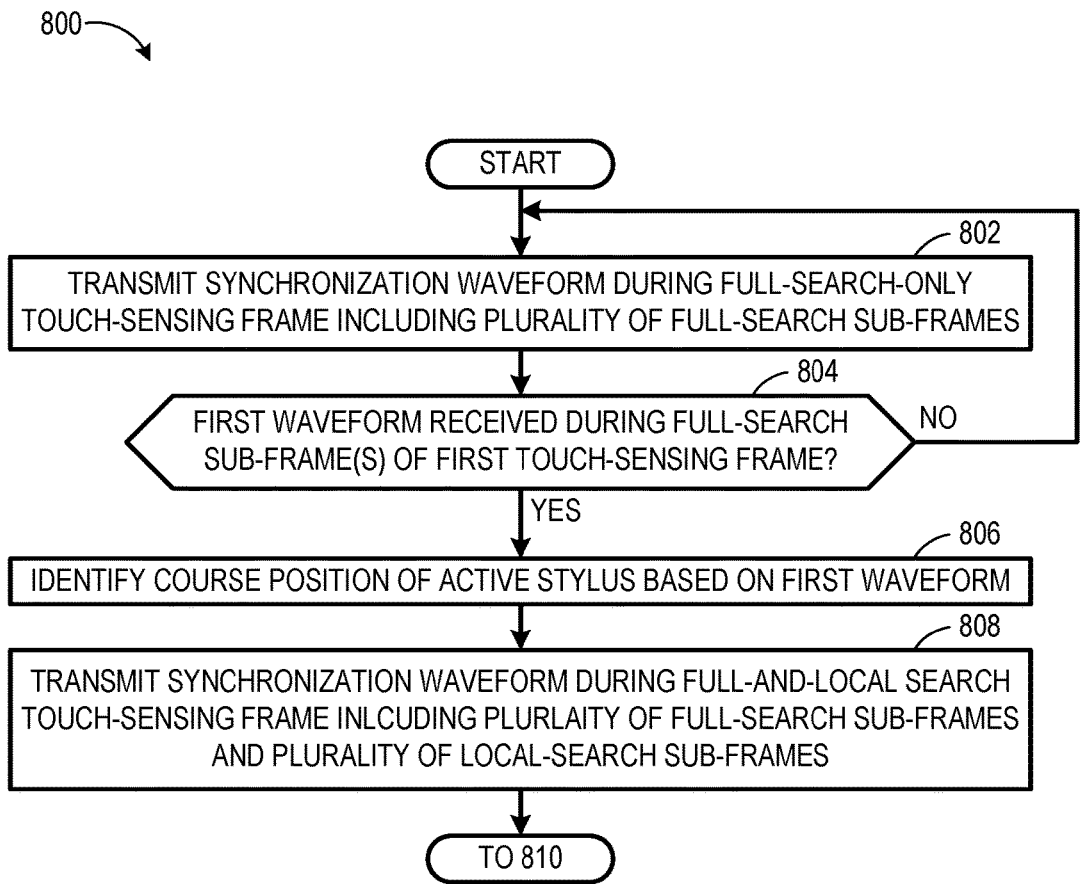
FIGS. 8 and 9 show an example touch-sensing method for a touch-sensitive device.
Figure 9:
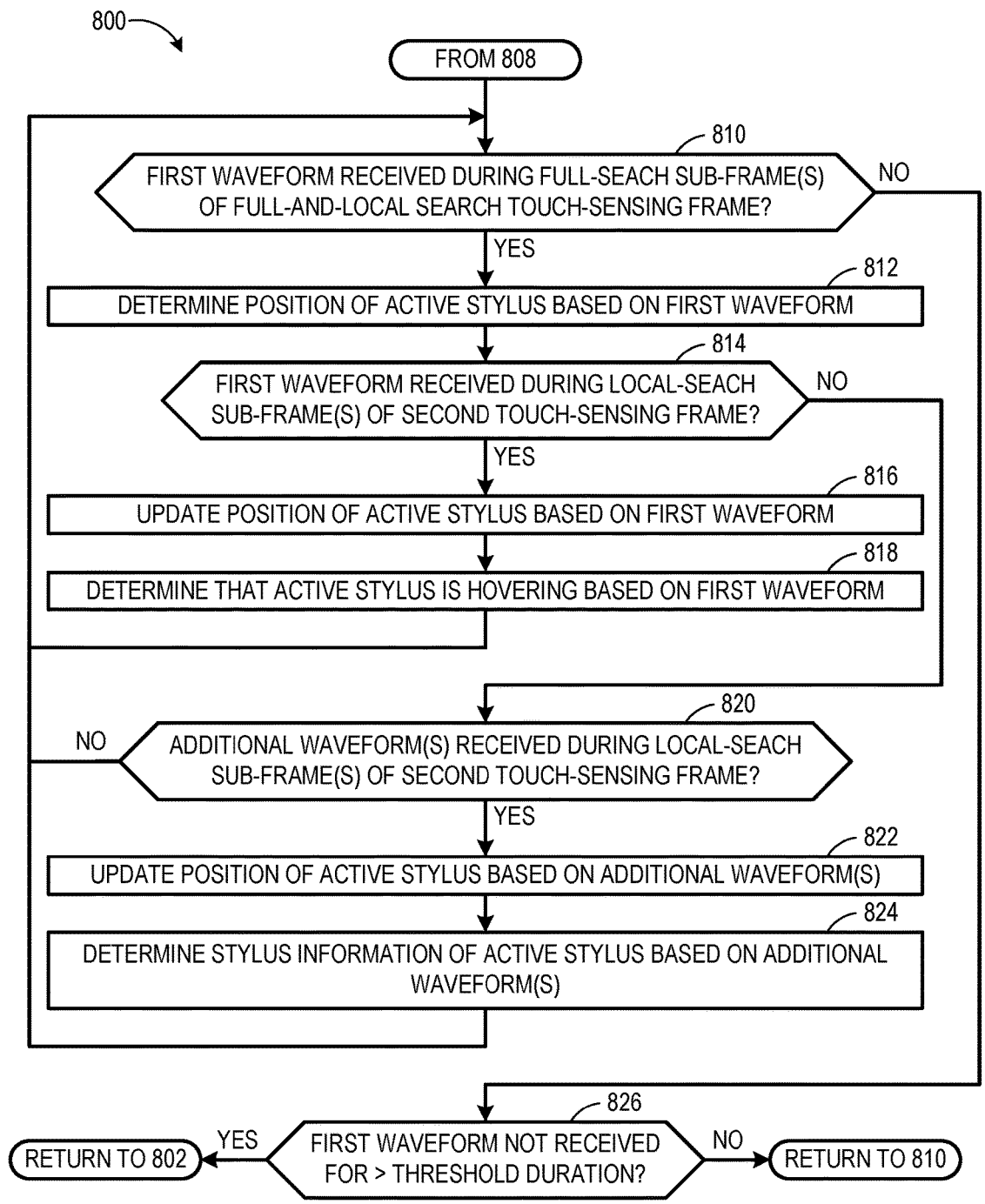

FIGS. 8 and 9 show an example touch-sensing method 800 for a touch-sensitive device. In one example, the method 800 may be performed by the touch sensor 300 of FIG. 3. Generally, the method 800 may be performed by any suitable touch-sensitive device.

At 802, the method 800 includes transmitting, via one or more electrodes of the touch sensor, a synchronization waveform during full-search-only touch-sensing frame including a plurality of full-search sub-frames. At 804, the method 800 includes determining if a first waveform is received from an electrode tip of an active stylus during a full-search sub-frame of the full-search-only touch-sensing frame. As referenced above, this first waveform may be referred to as a "locate" waveform. If the locate waveform is received from the active stylus, then the method moves to 806. Otherwise, the method 800 returns to 802, and re-transmits the synchronization waveform during a next touch-sensing frame. At 806, the method 800 includes identifying a coarse position of an active stylus based on the locate waveform and the band or region of the touch sensor corresponding to the full-search sub-frame in which the locate waveform was received.

Because the touch-sensitive device is operating in the full-search-only mode when the locate waveform is received, the touch-sensitive device switches to operation in the full-and-local search mode based on receiving the locate waveform. At 808, the method 800 includes transmitting the synchronization waveform during the full-and-local search touch-sensing frame. The full-and-local search touch-sensing frame includes a plurality of full-search sub-frames interleaved with a plurality of local-search sub-frames. At 810, the method 800 includes determining whether the first waveform is received during full-search subframe(s) of the full-and-local search touch-sensing frame. If the locate waveform is received during full-search sub-frame(s), then the method moves to 812, and a position of the active stylus is determined based on the locate waveform. In some implementations, this initial position determination is a coarse position determination (e.g., a band of the touch sensor). Otherwise, the method 800 moves to 826.

At 814, the method 800 includes determining whether the locate waveform is received during local-search subframe(s) of the full-and-local search touch-sensing frame. If the locate waveform is received during local-search sub-frame(s), then the method moves to 816. Otherwise, the method 800 returns to 820. At 816, the method 800 includes updating the position of the active stylus based on the locate waveform. In some implementations where a coarse position is initially determined, updating the position of the active stylus includes determining a more precise position of the active stylus. In other implementations, updating the position of the active stylus include updating the position with a same level of accuracy. At 818, the method 800 includes determining that the active stylus is hovering based on the locate waveform. Thus, as described above, the "locate waveform" may be the same as the "hover waveform." In one example, the locate waveform may encode a touch force that is equal to zero, which may be interpreted by the touch sensor as the active stylus is hovering.

At 820, the method 800 includes determining whether one or more additional waveforms that differ from the locate waveform are received during local-search subframe(s) of the full-and-local search touch-sensing frame. As referenced above, these one or more additional waveforms may be referred to as "report" waveforms that encode stylus information (and/or other information). If the one or more additional waveforms are received during local-search sub-frame(s), then the method moves to 822. Otherwise, the method 800 returns to 810. At 822, the method 800 includes updating the position of the active stylus based on the one or more additional waveforms. In some implementations where a coarse position is initially determined, updating the position of the active stylus includes determining a more precise position of the active stylus. In other implementations, updating the position of the active stylus include updating the position with a same level of accuracy. At 824, the method 800 includes determining stylus information of the active stylus based on the one or more additional waveforms. For example, the one or more additional waveforms may encode a touch force of the active stylus.

At 826, the method 800 may include determining whether the first waveform has not been received for greater than a threshold duration. If the locate waveform has been received within the threshold duration, then the method 800 returns to 810, and the touch-sensitive device continues operating in full-and-local search mode. Otherwise, the locate waveform has not been received for greater than the threshold duration, the method 800 returns to 802, and the touch-sensitive device switches back to operation in the full-search only mode.

In some implementations, the methods and processes described herein may be tied to a computing system of one or more computing devices. In particular, such methods and processes may be implemented as a computer-application program or service, an application-programming interface (API), a library, and/or other computer-program product.

Figure 10:
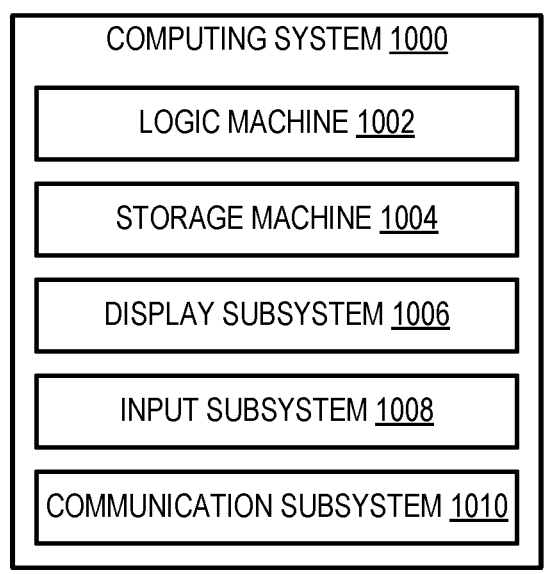
FIG. 10 shows an example computing system.

FIG. 10 schematically shows a non-limiting example of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. For example, computing system 1000 may represent interactive display system 100, touch-sensitive display device 200, and in general any suitable touch-sensitive device discussed herein.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem 1010 may be configured for communication via a wireless telephone network, or a wired or wireless local- or wide-area network. In some implementations, the communication subsystem 1010 may allow computing system 1000 to send and/or receive messages to and/or from other devices via a network such as the Internet.

In one example, a touch-sensitive device, comprises a capacitance-based touch sensor including a plurality of electrodes, drive circuitry configured to selectively drive the plurality of electrodes with a synchronization waveform to enable an active stylus to become time synchronized with the touch-sensitive device, receive circuitry configured to interpret a response on one or more electrodes of the plurality of electrodes to determine a position of the active stylus, the response caused by a first waveform being driven on a stylus electrode of the active stylus, and where the touch-sensitive device is configured to 1) upon receiving, via one or more electrodes of the plurality of electrodes, a first waveform from the active stylus at the first time relative to the synchronization waveform being transmitted, determine a position of the active stylus based on the first waveform being received at the first time, 2) upon receiving, via one or more electrodes of the plurality of electrodes, the first waveform at a second time relative to the synchronization waveform being transmitted, determine that the active stylus is hovering based on the first waveform being received at the second time, and 3) upon receiving, via one or more electrodes of the plurality of electrodes, the one or more additional waveforms at the second time, determine stylus information of the active stylus based on the one or more additional waveforms being received at the second time. In this example and/or other examples, the touch-sensitive device may be configured to: 1) when the touch-sensitive device has not received the first waveform for greater than a threshold duration, use a first touch-sensing frame to scan for input to the capacitance-based touch sensor, the first touch-sensing frame including a first set of sub-frames, and 2) when the touch-sensitive device has received the first waveform within the threshold duration, use a second touch-sensing frame including a second set of sub-frames to scan for input to the capacitance-based touch sensor, the second touch-sensing frame different than the first set of sub-frames. In this example and/or other examples, the first set of sub-frames may include a first plurality of full-search sub-frames, each full-search sub-frame may correspond to a subset of electrodes selected from the plurality of electrodes, and during each full-search sub-frame, the receive circuitry may be configured to connect, via selective multiplexing, to the electrodes of the corresponding subset to determine a position of the active stylus based on receiving the first waveform via one or more electrodes of the corresponding subset. In this example and/or other examples, the second set of sub-frames may include a second plurality of full-search sub-frames and a plurality of local-search sub-frames, during each full-search sub-frame of the second plurality of full-search sub-frames, the receive circuitry may be configured to connect, via selective multiplexing, to the electrodes of the corresponding subset to determine the position of the active stylus based on receiving the first waveform via one or more electrodes of the corresponding subset, and during each local-search sub-frame, the receive circuitry may be configured to connect, via selective multiplexing, to electrodes of a selected subset corresponding to the position of the active stylus to update the position of the active stylus based on receiving the first waveform or the one or more additional waveforms via one or more electrodes of the selected subset. In this example and/or other examples, the plurality of full-search sub-frames may be interleaved with the plurality of local-search sub-frames in the second touch-sensing frame. In this example and/or other examples, a duration of a full-search sub-frame of the first touch-sensing frame may be equal to a duration of a full-search sub-frame of the second touch-sensing frame and may be further equal to a duration of a local-search sub-frame of the second touch-sensing frame. In this example and/or other examples, the touch-sensitive device may be configured to determine a passive touch input based on a second waveform driven on one or more electrodes of the plurality of electrodes of the capacitance-based touch sensor during the full-search sub-frames of the first and second touch-sensing frames. In this example and/or other examples, the first waveform and the second waveform may be orthogonal relative to each other or have opposite polarities. In this example and/or other examples, the stylus information may include a non-zero touch force of the active stylus encoded into the one or more additional waveforms.

In an example, a touch-sensing method for a touch-sensitive device including a capacitance-based touch sensor including a plurality of electrodes comprises transmitting a synchronization waveform via one or more electrodes of the plurality of electrodes, upon receiving, via electrostatic coupling of one or more electrodes of the plurality of electrodes with a stylus electrode of an active stylus, a first waveform at a first time relative to the synchronization waveform being transmitted, determining a position of the active stylus based on the first waveform being received at the first time, upon receiving, via electrostatic coupling of the one or more electrodes of the plurality of electrodes with the stylus electrode of the active stylus, the first waveform at a second time relative to the synchronization waveform being transmitted, determining that the active stylus is hovering based on the first waveform being received at the second time, and upon receiving, via electrostatic coupling of the one or more electrodes of the plurality of electrodes with the stylus electrode of the active stylus, one or more additional waveforms at the second time, determining stylus information of the active stylus based on the one or more additional waveforms. In this example and/or other examples, the method may further comprise, when the first waveform has not been received for greater than a threshold duration, using a first touch-sensing frame to scan for input to the capacitance-based touch sensor, the first touch-sensing frame including a first set of sub-frames including a first plurality of full-search sub-frames, each full-search sub-frame corresponding to a subset of electrodes selected from the plurality of electrodes, determining a position of the active stylus based on the full-search sub-frame of the first touch-sensing frame during which the first waveform was received, when the first waveform has been received within the threshold duration, using a second touch-sensing frame to scan for input to the capacitance-based touch sensor, the second touch-sensing frame including a second set of sub-frames including a second plurality of full-search sub-frames and a plurality of local-search sub-frames, receiving the first waveform during a full-search sub-frame of the second touch-sensing frame, updating the position of the active stylus based on the full-search sub-frame of the second touch-sensing frame during which the first waveform was received, upon receiving the first waveform during a local-search sub-frame, determining that the active stylus is hovering based on the first waveform, upon receiving the one or more additional waveforms during a local-search sub-frame, determining stylus information of the active stylus based on the one or more additional waveforms; and updating the position of the active stylus based on receiving the first waveform or the one or more additional waveforms during a local-search sub-frame. In this example and/or other examples, the plurality of full-search sub-frames may be interleaved with the plurality of local-search sub-frames in the second touch-sensing frame. In this example and/or other examples, a duration of a full-search sub-frame of the first touch-sensing frame may be equal to a duration of a full-search sub-frame of the second touch-sensing frame and may be further equal to a local-search sub-frame of the second touch-sensing frame. In this example and/or other examples, the touch-sensitive device may be configured to determine a passive touch input based on a second waveform driven on one or more electrodes of the plurality of electrodes of the capacitance-based touch sensor during the full-search sub-frames of the first and second touch-sensing frames. In this example and/or other examples, the first waveform and the second waveform may be orthogonal relative to each other or have opposite polarities. In this example and/or other examples, the stylus information may include a non-zero touch force of the active stylus encoded into the one or more additional waveforms.

In an example, an active stylus, comprises a stylus electrode configured to capacitively couple with one or more electrodes of a capacitance-based touch sensor of a touch-sensitive device, receive circuitry operatively coupled to the stylus electrode and configured to receive a synchronization waveform from the touch-sensitive device, and transmit circuitry operatively coupled to the stylus electrode and configured to upon receiving the synchronization waveform, transmit information to the touch-sensitive device according to a communication frame including a first set of sub-frames and a second set of sub-frames, where the transmit circuitry is configured to 1) transmit a first waveform during one or more sub-frames of the first set, 2) if the active stylus is hovering, transmit the first waveform during one or more sub-frames of the second set, and 3) if the active stylus is not hovering, transmit one or more additional waveforms during one or more sub-frames of the second set. In this example and/or other examples, the one or more additional waveforms may encode stylus information. In this example and/or other examples, the stylus information may include a non-zero touch force of the active stylus. In this example and/or other examples, the sub-frames of the first set may be interleaved with the sub-frames of the second set in the communication frame.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive device, comprising:
a capacitance-based touch sensor including a plurality of electrodes;
drive circuitry configured to selectively drive the plurality of electrodes with a synchronization waveform to enable an active stylus to become time synchronized with the touch-sensitive device;
receive circuitry configured to interpret a response on one or more electrodes of the plurality of electrodes to determine a position of the active stylus, the response caused by a first waveform being driven on a stylus electrode of the active stylus; and
where the touch-sensitive device is configured to 1) upon receiving, via one or more electrodes of the plurality of electrodes, the first waveform from the active stylus at a first time associated with the synchronization waveform, determine from the first waveform, a position of the active stylus based on the first waveform being received at the first time, 2) upon receiving, via one or more electrodes of the plurality of electrodes, the first waveform at a second time associated with the synchronization waveform, determine, from the first waveform, that the active stylus is hovering based on the first waveform being received at the second time, and 3) upon receiving, via one or more electrodes of the plurality of electrodes, one or more additional waveforms at the second time, determine, from the one or more additional waveforms, stylus information of the active stylus based on the one or more additional waveforms being received at the second time.

2. The touch-sensitive device of claim 1, where the receive circuitry is configured to operate differently during the second time based on an operating condition.

3. The touch-sensitive device of claim 1, where operating differently includes using a different touch-sensing frame configuration during the second time.

4. The touch-sensitive device of claim 1, where the touch-sensitive device is configured to: 1) in response to the touch-sensitive device not receiving the first waveform for greater than a threshold duration, use a first touch-sensing frame to scan for input to the capacitance-based touch sensor, the first touch-sensing frame including a first set of sub-frames, and 2) in response to the touch-sensitive device receiving the first waveform within the threshold duration, use a second touch-sensing frame to scan for input to the capacitance-based touch sensor, the second touch-sensing frame including a second set of sub-frames different than the first set of sub-frames.

5. The touch-sensitive device of claim 4, where the first set of sub-frames includes a first plurality of full-search sub-frames, each full-search sub-frame corresponding to a subset of electrodes selected from the plurality of electrodes, and
where during each full-search sub-frame, the receive circuitry is configured to connect, via selective multiplexing, to the electrodes of the corresponding subset to determine a position of the active stylus based on receiving the first waveform via one or more electrodes of the corresponding subset.

6. The touch-sensitive device of claim 5,
where the second set of sub-frames includes a second plurality of full-search sub-frames and a plurality of local-search sub-frames,
where during each full-search sub-frame of the second plurality of full-search sub-frames, the receive circuitry is configured to connect, via selective multiplexing, to the electrodes of the corresponding subset to determine the position of the active stylus based on receiving the first waveform via one or more electrodes of the corresponding subset, and
where during each local-search sub-frame, the receive circuitry is configured to connect, via selective multiplexing, to electrodes of a selected subset corresponding to the position of the active stylus to update the position of the active stylus based on receiving the first waveform or the one or more additional waveforms via one or more electrodes of the selected subset.

7. The touch-sensitive device of claim 6, where the plurality of full-search sub-frames are interleaved with the plurality of local-search sub-frames in the second touch-sensing frame.

8. The touch-sensitive device of claim 6, where a duration of a full-search sub-frame of the first touch-sensing frame is equal to a duration of a full-search sub-frame of the second touch-sensing frame and is further equal to a duration of a local-search sub-frame of the second touch-sensing frame.

9. The touch-sensitive device of claim 6, where the touch-sensitive device is configured to determine a passive touch input based on a second waveform driven on one or more electrodes of the plurality of electrodes of the capacitance-based touch sensor during the full-search sub-frames of the first and second touch-sensing frames.

10. The touch-sensitive device of claim 9, wherein the first waveform and the second waveform are orthogonal relative to each other or have opposite polarities.

11. The touch-sensitive device of claim 1, wherein the stylus information includes a non-zero touch force of the active stylus encoded into the one or more additional waveforms.

12. A touch-sensing method for a touch-sensitive device including a capacitance-based touch sensor including a plurality of electrodes, the method comprising:
transmitting a synchronization waveform via one or more electrodes of the plurality of electrodes;
upon receiving, via electrostatic coupling of one or more electrodes of the plurality of electrodes with a stylus electrode of an active stylus, a first waveform at a first time relative to the synchronization waveform being transmitted, determining, from the first waveform, a position of the active stylus based on the first waveform being received at the first time;
upon receiving, via electrostatic coupling of the one or more electrodes of the plurality of electrodes with the stylus electrode of the active stylus, the first waveform at a second time relative to the synchronization waveform being transmitted, determining, from the first waveform, that the active stylus is hovering based on the first waveform being received at the second time, and
upon receiving, via electrostatic coupling of the one or more electrodes of the plurality of electrodes with the stylus electrode of the active stylus, one or more additional waveforms, at the second time, determining, from the one or more additional waveforms, stylus information of the active stylus based on the one or more additional waveforms being received at the second time.

13. The method of claim 12, further comprising:
in response to the first waveform having not been received for greater than a threshold duration, using a first touch-sensing frame to scan for input to the capacitance-based touch sensor, the first touch-sensing frame including a first set of sub-frames including a first plurality of full-search sub-frames, each full-search sub-frame corresponding to a subset of electrodes selected from the plurality of electrodes;
determining a position of the active stylus based on the full-search sub-frame of the first touch-sensing frame during which the first waveform was received;
in response to the first waveform having been received within the threshold duration, using a second touch-sensing frame to scan for input to the capacitance-based touch sensor, the second touch-sensing frame including a second set of sub-frames including a second plurality of full-search sub-frames and a plurality of local-search sub-frames;
receiving the first waveform during a full-search sub-frame of the second touch-sensing frame;
updating the position of the active stylus based on the full-search sub-frame of the second touch-sensing frame during which the first waveform was received;
upon receiving the first waveform during a local-search sub-frame, determining that the active stylus is hovering based on the first waveform;
upon receiving the one or more additional waveforms during a local-search sub-frame, determining stylus information of the active stylus based on the one or more additional waveforms; and
updating the position of the active stylus based on receiving the first waveform or the one or more additional waveforms during a local-search sub-frame.

14. The method of claim 13, where the plurality of full-search sub-frames are interleaved with the plurality of local-search sub-frames in the second touch-sensing frame, and where a duration of a full-search sub-frame of the first touch-sensing frame is equal to a duration of a full-search sub-frame of the second touch-sensing frame and is further equal to a local-search sub-frame of the second touch-sensing frame.

15. The method of claim 13, where the touch-sensitive device is configured to determine a passive touch input based on a second waveform driven on one or more electrodes of the plurality of electrodes of the capacitance-based touch sensor during the full-search sub-frames of the first and second touch-sensing frames.

16. The method of claim 15, where the first waveform and the second waveform are orthogonal relative to each other or have opposite polarities.

17. The method of claim 12, where the stylus information includes a non-zero touch force of the active stylus encoded into the one or more additional waveforms.

* * * * *